United States Patent
Helfrich

(10) Patent No.: US 8,064,613 B1
(45) Date of Patent: Nov. 22, 2011

(54) ELECTRET MICROPHONE DETECTION USING A CURRENT SOURCE

(75) Inventor: Kenneth Jay Helfrich, Duluth, GA (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 886 days.

(21) Appl. No.: 12/041,163

(22) Filed: Mar. 3, 2008

(51) Int. Cl.
*H04R 25/00* (2006.01)

(52) U.S. Cl. .......................... 381/74; 381/113; 381/384

(58) Field of Classification Search .................. 381/74, 381/111, 113, 114, 115, 116, 122, 384; 455/550.1, 455/557, 558
See application file for complete search history.

(56) References Cited

U.S. PATENT DOCUMENTS

| | | | |
|---|---|---|---|
| 7,623,667 B2 * | 11/2009 | Sander et al. | 381/74 |
| 7,869,608 B2 * | 1/2011 | Sander et al. | 381/113 |
| 7,937,109 B2 * | 5/2011 | Wilson | 455/557 |

FOREIGN PATENT DOCUMENTS

WO WO-2008/014422 A1 1/2008
* cited by examiner

*Primary Examiner* — Huyen D Le
(74) *Attorney, Agent, or Firm* — Blakely Sokoloff Taylor & Zafman LLP

(57) ABSTRACT

The coupling of an electret microphone is detected and identifying whether there is monaural or stereo speakers coupled to the USB connector is accomplished by coupling a current source to the USB ID terminal and detecting the voltage on the ID terminal. If the voltage on the ID line is substantially below the voltage associated with any other accessory when an electret microphone is coupled between the ID terminal and the ground terminal, and a microphone bias resistor is coupled to the ID line. On detection of an electret microphone being coupled between the ID terminal and the ground terminal, whether there is a monaural or stereo speakers coupled to the USB connector is determined by detecting the impedance on the one of the D+ and D– terminals to which a monaural speaker would not be coupled. An open circuit indicates a monaural speaker, otherwise stereo speakers are connected. An alternate embodiment is disclosed.

14 Claims, 2 Drawing Sheets

ELECTRET MICROPHONE DETECTION USING A CURRENT SOURCE

BACKGROUND OF THE INVENTION

1. Field of the Invention

The present invention relates to the field of cell phones and other portable equipment using a USB bus connector.

2. Prior Art

The USB bus has five bus connections, namely VBUS (power), two data lines D+ and D—, an ID (identification) line and ground. In a cell phone application using a MiniB or micro-B USB connector on the phone, an accessory connected to the connector may be identified by the phone by checking the value of a resistor coupled between the ID line and ground line in the accessory. In that regard, there is a published specification CEA-936A describing the use of a Mini-B or Micro-B USB connection for other accessories, but it only allows 2 wires (D+ and D− data lines) for signals. Consequently a Mini-B or Micro-B USB connection in accordance with CEA-936 A specification cannot accommodate the combination of a microphone and a stereo headset.

A typical microphone detection circuit detects the bias voltage of the attached microphone. As shown in FIG. 1, a comparator is used to check the voltage across the microphone JFET preamplifier with a typical 2.2K pull up resistor. This pulls the ID line to the supply voltage when a microphone is not connected. With a microphone connected, the voltage across the microphone is about 1.18 volts, and the output of the comparator changes state due to the inverting input being biased at 2.27 volts. However the bias voltage of the microphone varies due to JFET characteristics and makes reusing the microphone connection for detecting other accessories difficult and unreliable.

DETAILED DESCRIPTION OF THE PREFERRED EMBODIMENTS

Figure 1:
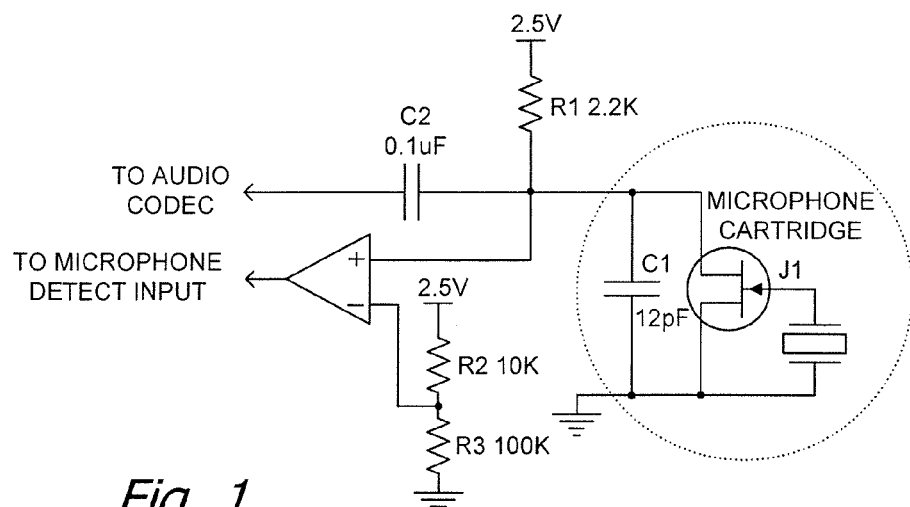
FIG. 1 is a diagram of a typical prior art microphone sensing circuit.

The present invention allows a Mini-B or Micro-B USB connector to support multiple accessories in a portable device, including headsets with internal microphones. A large number of cellular phones are now using a single USB connector for accessory support instead of a custom multi-pin connector. The small number of pins (5 pins) in a Mini-B or Micro-B USB connector requires that multiple signals be multiplexed onto the same pins. The typical method to detect the connected accessory is to use a resistor connected to ground in the accessory and a pull up resistor and an ADC in the phone to read the resistor value, as previously described with respect to FIG. 1. Due to the limited number of pins, in order to support a stereo headset with a microphone, the microphone must be connected to the signal which was previously used for the identification resistor. The present invention uses a low value current source to exploit the current versus voltage characteristics of the JFET preamplifier internal to the microphone to allow this line to still be used for accessory identification resistors.

Figure 2:
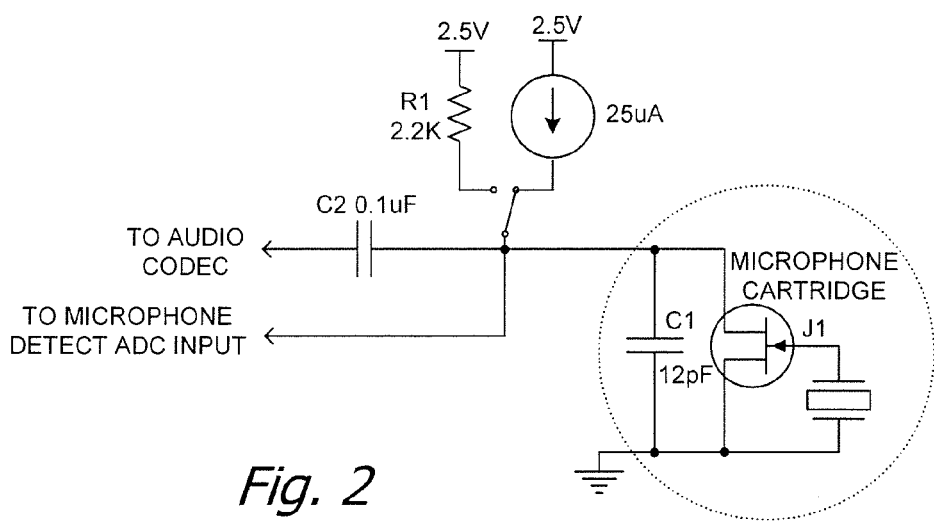
FIG. 2 is a diagram of a part of one embodiment of the present invention.
Figure 3:
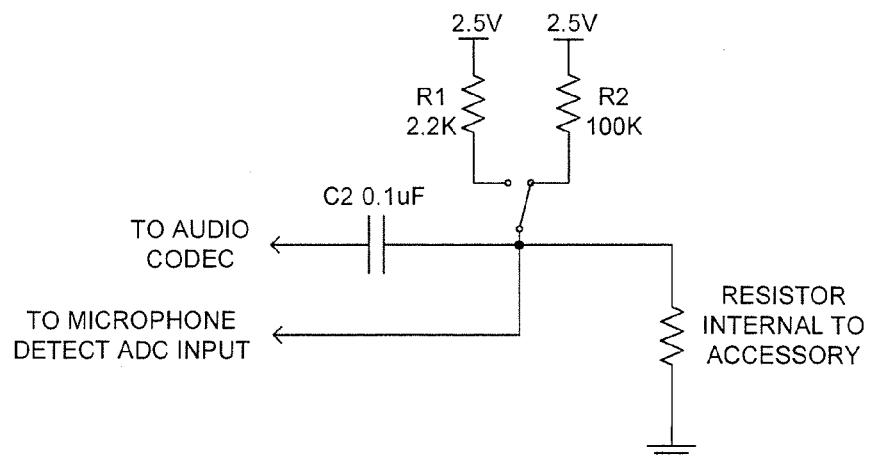
FIG. 3 is a diagram similar to FIG. 2 showing an alternate embodiment of the present invention.

The idea behind this invention is to use a low value current source for the accessory detection, as shown in FIG. 2. This current source can be an active current source such as a 25 uA current source, as shown in FIG. 2, or a simple resistor such as a 100K resistor, as shown in FIG. 3. With no microphone (or anything else other than perhaps a free USB cable) connected, and assuming a high input impedance to the microphone detection circuit such as the ADC shown, the current source will charge capacitor C2 to within the headroom required for an active current source, or to the full supply voltage for a resistive current source. Thus a high voltage detected on the ID terminal by the detection circuit indicates no accessories are connected to the USB port.

The JFET in this case will be biased with about a −0.3V bias on the gate due to a pre-stressing on the ceramic piezoelectric microphone element. In one typical Electret microphone, this gives a drain current when connected to the 100K resistor of FIG. 3 of approximately 21 uA and a drain voltage of approximately 36 mv. Thus when a microphone is connected, the JFET will sink the current of the 100K current source with only a small drain-source voltage resulting, which indicates to the detection circuitry that a microphone has been connected. When a microphone is detected, the current source is disconnected and a 2.2K ohm resistor is connected for correct microphone operation through the ID connection. Note that the disconnection of the current source is optional, particularly if the 100K resistor and the 2.2K resistor are connected to the same source of power. By way of example, if a 100 K current source resistor is left connected, the Bias resistance would look like a 2.15 K bias resistor.

Note that when the microphone is disconnected, the 2.2 K pull-up resistor will pull the ID connection to the supply voltage again, indicating an open condition on the ID line, at which time the ID connection is switched back to the active or 100 K current source.

The current source will force the JFET to have a small drain-source voltage (substantially zero) across it when a microphone is connected, which leaves a large voltage range for detecting resistor values of other accessories when connected instead of a microphone. The ability to use the ID line for both resistor value sensing and sensing and operating a microphone is a key aspect of the present invention. Table 1 shows an exemplary range of possible resistor values with suggested accessory types that could be used with the present invention. Of course these are nominal values, with each preferably having a range of applicable voltages, the microphone being characterized by a lower ID voltage than any other accessory, and no accessory attached and a USB cable attached being characterized by a higher voltage ID line than any associated with any accessory being attached.

TABLE 3

| Pull up resistor | | 100K | |
| --- | --- | --- | --- |
| LDO voltage | | 2.3 | |
| Register Value | Resistor Value KΩ | Voltage | Function |
| 000 | | 0 | Microphone |
| 001 | 68.1 | 0.94 | USB Test Mode 2 | Not Supported By SW252 |
| 010 | 97.6 | 1.14 | USB Test Mode 1 | Not Supported By SW252 |
| 011 | 143 | 1.35 | UART Test Mode 1 | Not Supported By SW252 |
| 100 | 205 | 1.55 | UART Cable | |

TABLE 3-continued

| | Pull up resistor | 100K | |
| | LDO voltage | 2.3 | |
| Register Value | Resistor Value KΩ | Voltage | Function |
| --- | --- | --- | --- |
| 101 | 294 | 1.72 | Stereo Headset |
| 110 | 475 | 1.90 | Charger |
| 111 | Open | 2.30 | USB Cable |

The values in Table 1 would be operative to provide reasonable separation of accessory detection voltages when connected in series with an active current source or a 100 K resistor.

Figure 4:
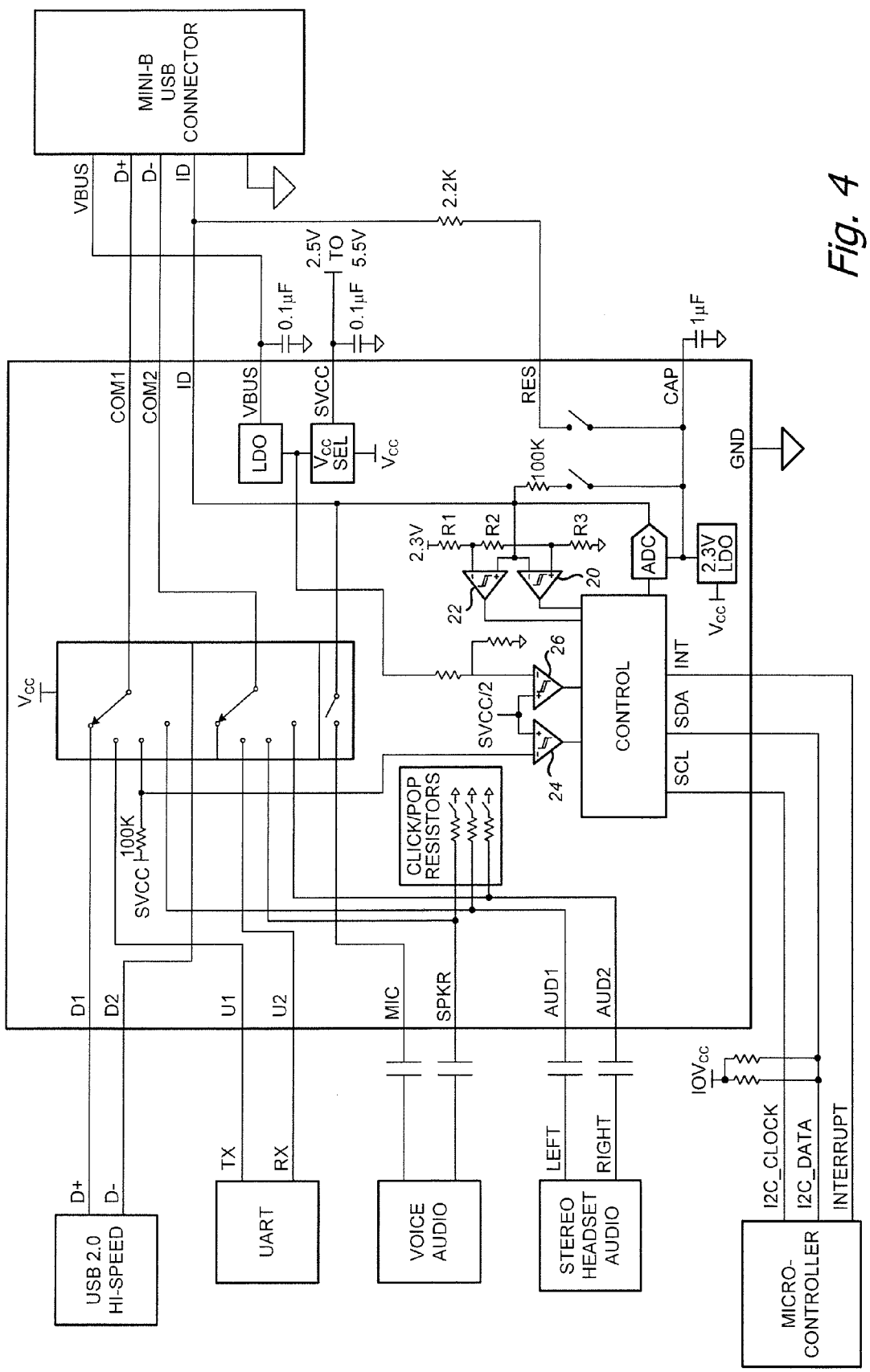
FIG. 4 is a diagram of the multiplexer circuit used with a preferred embodiment of the present invention.

FIG. 4 presents a block diagram of a USB Port Multiplexer in accordance with the present invention for USB, UART and audio connections. The multiplexer may be used in devices such as cell phones, media players, PDAs and handheld devices. The multiplexer uses the present invention to detect the nature of external devices connected to the Mini-B or micro-B USB connector and provide internal switching within the device in which it resides for the proper coupling to the external device. The multiplexer has the capability of sensing the connection (and disconnection) of a USB 2.0 bus, a UART, a monaural speaker—microphone combination (Voice Audio in FIG. 4) and a stereo headset and microphone combination (Stereo Headset Audio in FIG. 4).

In the USB mode, the multiplexer is powered from the VBUS power input even if SVCC is also present. Thus this mode requires VBUS to be present to operate.

In the Voice Audio mode, one speaker driver output and a microphone input is supported. The microphone input is preferably routed to the ID line. The signal routing is controlled through the I2C bus.

In the Stereo Audio, the multiplexer will route the LEFT and RIGHT channel audio to the D+ and D– lines on the Mini-B or Micro-B connector. The multiplexer will accommodate a stereo headset with a microphone by routing the microphone signal from the Voice Audio input to the ID line on the Mini-B or Micro-B connector.

The multiplexer includes a detection circuit for a switch connected to a microphone line on a wired headset. The switch will controllably short the microphone line to ground. The multiplexer detects this with a dedicated comparator, namely comparator 20. Likewise, there is another comparator 22 to detect when the microphone is removed. This comparator is required since in the preferred embodiment of the multiplexer, the ADC is turned off when a microphone is detected to reduce noise. The outputs for these comparators are only valid if the external 2.2K resistor bias switch is closed.

The multiplexer is configured to use the detection method previously described for determining the type of device attached to the Mini-B or Micro-B USB port. Table 1 above lists suggested ID resistor values for the accessories. Thus the multiplexer measures the voltage at the ID line by connecting the 100 KΩ resistor R2 between the internal 2.3 volt LDO and the ID pin and measuring the voltage. If a microphone is detected, the 100K current source is preferably turned off and a 2.2K pull-up resistor R1 is connected to bias the microphone.

The microphone case presents a problem for audio device discrimination because both the mono headset and stereo headset have a microphone connected to the ID pin. The solution is to measure the impedance at the COM1 line (D+) when a microphone is detected on the ID line. If there is no speaker on COM1, then a monaural headset is detected. An internal comparator 24 is provided to sense the COM1 speaker load. Also the USB cable connected to an accessory device compared to an open or no USB cable is difficult to detect because it has the ID line open. This looks the same as no device plugged in, so the VBUS voltage is used to detect the USB cable. An internal comparator 26 detects the presence of VBUS.

The multiplexer is controlled by a Microcontroller through an I2C bus connection, with interrupt, in communication with an on chip Control. In that regard, every time a new connection or disconnection to the Mini-B or Micro-B USB Connector is made, an interrupt is generated, and serviced under control of the Microcontroller. In general, many of the functions and parameters controlling the functions of the on-chip Control are themselves programmable, so that the sense resistor values and other parameters may be varied as desired. The Control, of course, ultimately controls the electronic switches SW, which may have an open Mini-B or Micro-B USB Connector state of all switch positions open, or alternatively, a predetermined default state.

As an alternative to the foregoing, the JFET amplifier in the microphone will exhibit nonlinear voltage versus current (impedance) characteristics that can be easily sensed by applying two or more current levels for detection purposes, and sensing whether the voltage versus current is linear of nonlinear. The JFET will be nonlinear, while the resistors in other accessories will exhibit a linear voltage versus current. In this way, the voltages associated with JFET detection need not be unique relative to one or more voltages used to sense other accessories, as it is the nonlinearity, not the voltages themselves that indicate the presence of a JFET.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. In a device having a USB connector, a method of detecting the coupling of an electret microphone and identifying whether there is monaural or stereo speakers coupled to the USB connector, the USB connector having VBUS, D+, D–, ID and ground terminals, comprising:
coupling a current source to the ID terminal and detecting the voltage on the ID terminal; and,
detecting that the voltage on the ID line is substantially below the voltage associated with any other accessory when an electret microphone is coupled between the ID terminal and the ground terminal, and coupling a microphone bias resistor to the ID line; and,
on detection of an electret microphone being coupled between the ID terminal and the ground terminal, determining whether there is a monaural or stereo speakers coupled to the USB connector by detecting the impedance on the one of the D+ and D– terminals to which a monaural speaker would not be coupled.

2. In a device having a USB connector, a method of detecting the coupling of and identifying accessories coupled to the USB connector, including an electret microphone and speakers that may be connected, the USB connector having VBUS, D+, D–, ID and ground terminals, comprising:
coupling a current source to the ID terminal and detecting the voltage on the ID terminal; and,
when an electret microphone is coupled between the ID terminal and the ground terminal, detecting that the voltage on the ID line is substantially below the voltage associated with any other accessory, and coupling a microphone bias resistor between a voltage source and the ID line;

when another accessory is coupled between the ID terminal and the ground terminal, identifying the accessory coupled to the USB connector based on the voltage detected on the ID terminal.

3. The method of claim 2 further comprising, on detection of an electret microphone being coupled between the ID terminal and the ground terminal, determining whether there is a monaural or stereo speakers coupled to the USB connector by detecting the impedance of the one of the D+ and D− terminals to which a monaural speaker would not be coupled.

4. The method of claim 2 further comprising detecting the decoupling of an accessory from the USB connector by detecting the voltage on the ID line exceeding a voltage associated with any accessory being coupled to the USB connector.

5. The method of claim 2 further comprising detecting the decoupling of an accessory from the USB connector by detecting the voltage on the ID terminal rising to a voltage at least substantially equal to the voltage supplied to the current source.

6. The method of claim 2 further comprising detecting the coupling of a USB cable to the USB connector by detecting that the voltage on the ID terminal is substantially equal to the voltage supplied to the current source and the voltage on the VBUS terminal is substantially equal to 5 volts.

7. The method of claim 2 wherein the current source is an active current source.

8. The method of claim 2 wherein the current source is a resistor.

9. The method of claim 2 wherein the resistance of the current source resistor is greater than the resistance of the microphone bias resistor.

10. In a device having a USB connector, a method of detecting the coupling of any of a USB communication device, a UART, an electret microphone and a monaural speaker, and an electret microphone and stereo speakers, to the USB connector, and coupling the USB connector terminals to respective circuitry in the device, the USB connector having VBUS, D+, D−, ID and ground terminals, comprising:

coupling a current source to the ID terminal; and,
 a) detecting when an electret microphone is coupled between the ID terminal and the ground terminal by detecting that the voltage on the ID line is substantially below the voltage associated with any other accessory, and coupling a microphone bias resistor between a voltage source and the ID line;
 b) when an electret microphone is detected, detecting the impedance on the D+ or D− terminal that a monaural speaker would not be connected to, and
  if in b), an open circuit is detected, connecting a microphone bias resistor between a voltage source and the microphone on the ID terminal, and connecting the microphone on the ID terminal and the monaural speaker on the D+ or D− terminal that a monaural speaker would not be connected, to voice audio connections;
  if in b), an open circuit is not detected, connecting a microphone bias resistor between a voltage source and the microphone on the ID terminal, and connecting the microphone on the ID terminal and stereo speakers on the D+ and D− terminals to stereo headset audio connections;
 c) detecting when a UART is coupled to the USB connector based on the voltage detected on the ID terminal, and connecting the UART to UART connections;
 d) detecting when a USB device is coupled to the USB connector by detecting a voltage on the VBUS terminal and connecting the D+ and D− terminals to USB connections; and
 e) detecting when a microphone or the UART is disconnected from the ID terminal by detecting the voltage on the ID terminal being substantially equal to the voltage of the current source;
 f) detecting when a USB bus is disconnected from the USB connector by detecting when a voltage source on the VBUS terminal is removed.

11. In a device having a USB connector, a method of detecting the coupling of and identifying accessories coupled to the USB connector, including an electret microphone and speakers that may be connected, the USB connector having VBUS, D+, D−, ID and ground terminals, comprising:

coupling a first current source to the ID terminal and detecting a first voltage on the ID terminal;
coupling a second current source to the ID terminal and detecting a second voltage on the ID terminal;
 when an electret microphone is coupled between the ID terminal and the ground terminal, detecting that the first and second voltages represent the presence of a nonlinear impedance on the ID terminal, and coupling a microphone bias resistor between a voltage source and the ID line;
 when another accessory is coupled between the ID terminal and the ground terminal, identifying the accessory coupled to the USB connector based on the voltages detected on the ID terminal.

12. A multiplexer comprising:
switching circuitry having first terminals of VBUS, D+, D−, ID and ground for coupling to a USB connector, and second terminals for connecting to voice audio circuitry and stereo headset audio circuitry in a device responsive to electrical conditions on the first terminals; and,
control circuitry to couple a current source to the ID terminal and detect the voltage on the ID terminal; and for,
 detecting that the voltage on the ID line is substantially below the voltage associated with any other accessory when an electret microphone is coupled between the ID terminal and the ground terminal, and coupling a microphone bias resistor between a voltage source and the ID line;
 on detection of an electret microphone being coupled between the ID terminal and the ground terminal, determining whether there is a monaural or stereo speakers coupled to the USB connector by detecting the impedance of the one of the D+ and D− terminals to which a monaural speaker would not be coupled;
 when the impedance of the one of the D+ and D− terminals to which a monaural speaker would not be coupled indicates an open circuit, coupling the ID terminal and one of the D+ and D− terminals to which a monaural speaker would be coupled to the second terminals for voice audio; and
 when the impedance of the one of the D+ and D− terminals to which a monaural speaker would not be coupled does not indicate the presence of an open circuit, coupling the ID terminal and the D+ and D− terminals to the second terminals for stereo headset audio.

13. The multiplexer of claim 12 wherein the switching circuitry includes second terminals for coupling to USB circuitry, and wherein the control circuitry can also detect the presence of a USB connection to the first terminals by detecting the presence of approximately 5 volts on the VBUS first terminal.

14. The multiplexer of claim 12 wherein the switching circuitry includes second terminals for coupling to UART circuitry, and wherein the control circuitry can also detect the connection of a UART to the first terminals by detecting a respective voltage on the ID first terminal when coupling a current source to the ID terminal.

* * * * *